United States Patent [19]

Manning

[11] 4,208,829

[45] Jun. 24, 1980

[54] BAIT STATION

[75] Inventor: George Manning, Chicago, Ill.

[73] Assignee: Rocon Industries, Inc., Chicago, Ill.

[21] Appl. No.: 914,875

[22] Filed: Jun. 12, 1978

[51] Int. Cl.² .............................................. A01M 25/00
[52] U.S. Cl. ..................................................... 43/131
[58] Field of Search ............. 43/131, 124, 121, 132 R

[56] References Cited

U.S. PATENT DOCUMENTS

| | | | |
|---|---|---|---|
| 1,633,982 | 6/1927 | Davis | 43/131 |
| 1,964,611 | 6/1934 | Watson | 43/131 |
| 2,764,840 | 10/1956 | Mayfield | 43/131 |
| 2,768,469 | 10/1956 | Mathias | 43/131 |
| 3,008,262 | 11/1961 | Ronicker | 43/131 |
| 3,488,879 | 1/1970 | Laughlin | 43/131 |
| 3,772,820 | 11/1973 | Bond | 43/131 |

*Primary Examiner*—Nicholas P. Godici

[57] ABSTRACT

A bait station comprised of a container for poisoned rodent food having limited access thereto and shielded by a wall having guarded openings to limit the entrance therein to rodents only. The station also includes securing means to prevent its displacement and a gravity flow system for delivery of poisoned rodent food.

6 Claims, 3 Drawing Figures

BAIT STATION

BACKGROUND AND SUMMARY OF THE INVENTION

The invention pertains to apparatus for reducing the rodent population, and is more particularly concerned with a bait station of a kind that enables a rat to enter the station, feed on poisoned bait and then leave the station to succomb elsewhere. The structure of the station is such that animals of a size greater than a rat cannot enter the station and feeding area to consume the poisoned bait, and consequently there is little danger that pets, such as dogs and cats would be harmed.

Yet, the construction of the bait station is such as to make it appealing to rodents, in accordance with their observed behavior. Easy access and suitable retreat for the rodent is provided, without discouraging rodent entry into the station, and the poisoned feed is accessible to the rodent, without allowing the feed to become adulterated as to discourage its taking by the rat.

More specifically, the bait station comprises a large diameter open top housing having a perimeter wall and a top closure which can be removably secured as by a lock. Arranged axially within the housing is a cylindrical container forming a feeder having a multitude of feed openings to enable the rodent, entering the outside wall through entrance openings therein, to feed on the contents of the container. As the rat is a most cautious animal, multiple entries are provided so that the rat will recognize its easy escape from the station. The feeder has multiple openings constructed so that fresh bait will fall into the feeding area as it is consumed. Means is also provided to anchor the station so that it may be placed in a selected position for maximum effect.

OBJECTS OF THE INVENTION

It is therefore the object of the present invention to provide a rodent bait station for dispensing poisoned feed of the character referred to.

Another object is to provide a bait station containing poisoned rodent feed, so constructed as to provide protection for animals other than rodents.

Another object is to provide apparatus of the character referred to which has anchor means to retain it in selected position and feeder access means to permit easy filling while limiting access to the poisoned bait.

Another object is to provide a bait station which may be easily entered by rodents and which provides for easy escape therefrom without fear of capture.

Another object is to provide a feeder for a rodent bait station which has gravity flow means for delivery of fresh bait to a rodent feeding area within the bait station.

Another object is to provide a bait station of the character referred to which is not expensive or difficult to manufacture, is easy to install and service, and simple to use while being very efficient for the purpose intended.

The structure by means of which the above and such other objects and advantages of the invention are attained, is described in the following specification, taken in conjunction with the accompanying drawings, showing a preferred illustrative embodiment of the invention.

DESCRIPTION OF A PREFERRED EMBODIMENT

Figure 1:
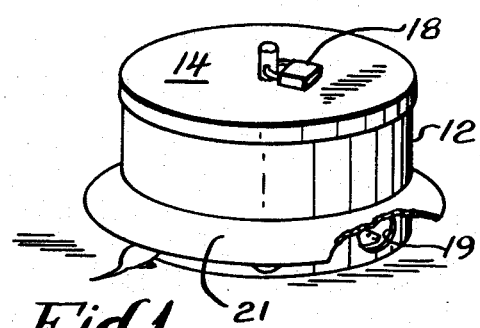
FIG. 1 is a perspective view of a bait station embodying the present invention.
Figure 2:
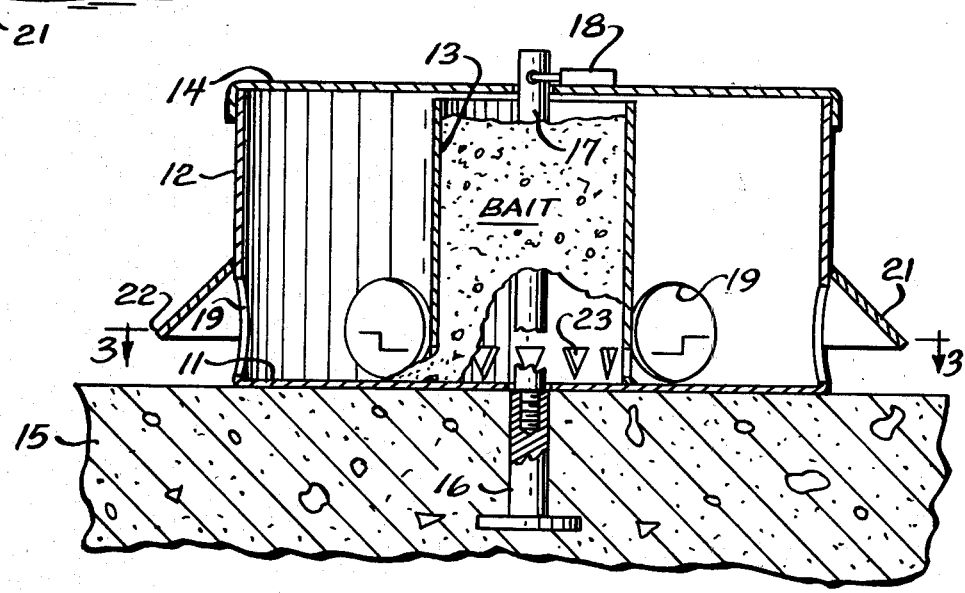
FIG. 2 is a vertical central sectional view of the illustrated bait station.
Figure 3:
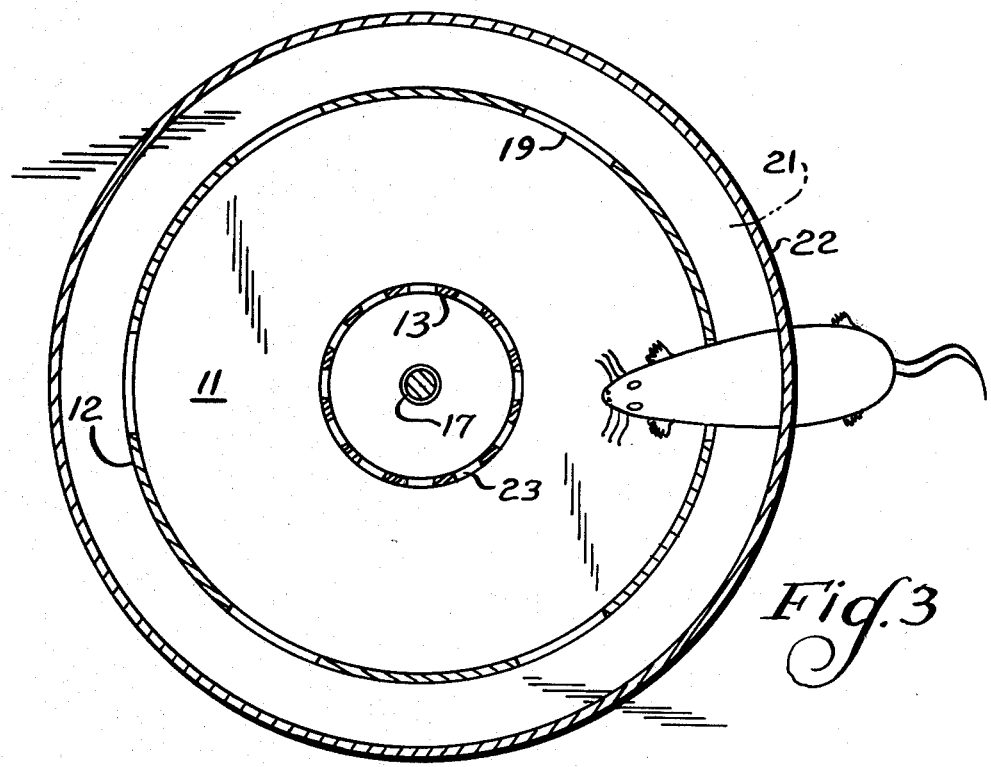
FIG. 3 is a horizontal sectional view of the bait station taken substantially on line 3—3 of FIG. 2.

Referring now to the exemplary disclosure of the invention shown in the accompanying drawings, the apparatus includes a bottom wall 11, preferably circular in outline and of substantial diameter, having an integral upstanding perimeter wall 12 or shell. Axially arranged within the confine of the perimeter wall 12 is an upstanding bait container or feeder 13, welded or otherwise secured firmly to the bottom wall 11. An externally flanged top wall or cover 14 is seated on the perimeter wall or shell 12.

The assembly hereinabove described is secured to a selected surface, such as a cement block or floor 15, by embedding in the floor a headed stud 16 which may be screw threaded at its upper end to receive the lower threaded end of an axial rod 17, which extends upwardly through the bottom wall 11, the bait container 13 and out through an aperture in the cover 14. Removal of the cover 14 may be prevented by a lock 18 engaged with the rod 17.

A plurality of equally spaced apart circular openings 19 of a size having a diameter sufficient to permit passage of a rodent are provided in the perimeter wall 12. The entrance of larger or less facile animals through the openings 19 is prevented by arranging around the outside of the perimeter wall 12 and just above the openings 19, an outwardly-downwardly extending skirt 21. The outside peripheral edge 22 of the skirt preferably terminates at an elevation above the floor 15 just sufficient to admit a rodent therebeneath.

The feeder or bait container 13 has an open top which is accessible for insertion of poisoned bait into the container when the lock 18 is disengaged and the cover 14 is removed. Poisoned bait falls from the container 13 into the area between the container and the interior defined by the perimeter wall 12 through a plurality of openings 23 at the base of the container wall. Preferably, these openings have the shape of inverted triangles, and permit poisoned bait to fall into the feeding area as quantities thereof are consumed.

Preferably, the openings 23 are formed in the manner described to restrict the spread of poisoned bait to the vicinity of the container 13. A tray (not shown) may be provided on the floor or bottom wall 11 of the bait station surrounding the bait container 13, which may also serve to restrict the bait spread without inhibiting free feeding by the rodents.

Typically, a rat will sense the aroma of the feed within the station, and will cautiously peer into the feeder area to determine if there is danger from entry, at which time the rodent will sense the easy entry into and retreat from the feeding area and will enter the bait station. As the feed on the floor 11 is consumed by the rat, fresh food will fall from the container openings 23 available for consumption. When the rodent has eaten its fill, it will leave the bait station to die elsewhere from the poison consumed, usually in its burrow.

It should be evident that the structure herein described may be easily and quickly assembled. The station is also safe to use and readily supplied with feed.

Although a preferred embodiment of the invention has been described in considerable detail, it will be understood that the description thereof is intended to be illustrative and not restrictive, as many details of the structure disclosed may be modified or changed without departing from the spirit or scope of the invention. Accordingly, it is not desired that the invention should be restricted to the exact construction shown and described.

I claim:

1. A bait station for delivering poisoned feed to a rodent feeding area therein, said bait station comprising, a bottom wall, an upstanding perimeter wall integral with the bottom wall, a bait container enclosed by the perimeter wall, a removable cover for the bait container of such size as to overlie the upper edge of the perimeter wall, an upstanding post extending upwardly through the bottom wall, the bait container and the cover, means anchoring the post to a surface beneath the bottom wall, a plurality of spaced openings in the perimeter wall closely adjacent to the bottom wall, means overlying a substantial portion of each opening to restrict access to said opening, a plurality of spaced openings in the container wall for delivering bait contained within the container, and means locking the cover in place, said opening overlying means comprising an outwardly-downwardly flared skirt on and surrounding the perimeter wall, said skirt having its free edge spaced from the surface a distance approximating one-half the dimension of said openings.

2. The bait station recited in claim 1, wherein the perimeter wall openings are circular.

3. A bait station for delivering poisoned feed to a rodent feeding area therein, said bait station comprising, a bottom wall, a perimeter wall upstanding on the bottom wall, a bait container having an open top and enclosed within said perimeter wall, a rodent feeding area between said perimeter wall and bait container, a removable cover closing the rodent feeding area and the open top of said bait container which may be opened to expose the interiors of said rodent feeding area and said bait container, a plurality of spaced apart rodent access openings in said perimeter wall closely adjacent said bottom wall, an outwardly-downwardly flared skirt on and surrounding said perimeter wall, said skirt having a free edge spaced from said perimeter wall a distance to shield a substantial portion of each of said rodent access openings, a plurality of spaced apart apertures in the bait container for delivering bait to the feeding area, and means for removably securing said cover in place.

4. The bait station recited in claim 3, wherein the spaced apertures in the container wall are inverted triangles.

5. The bait station recited in claim 3, wherein the container wall apertures are closely spaced adjacent to the bottom wall.

6. The bait station recited in claim 3, wherein an anchoring post extends upwardly from the bottom wall through the bait container and cover, and said cover securing means is secured to said post.

* * * * *